Patented June 23, 1942

2,287,567

UNITED STATES PATENT OFFICE 2,287,567

COMPOSITION OF MATTER AND PROCESS OF USING THE SAME

Grover C. Porter, Maricopa, Calif.

No Drawing. Application November 24, 1939, Serial No. 305,938

7 Claims. (Cl. 252—331)

This invention relates to a composition of matter and to a process for using the same in the demulsification of petroleum oil products.

The object of the invention is to provide a composition of matter and a process for using the same which will economically and effectively demulsify water in oil emulsions, particularly oil field emulsions, so that the water and the oil may be separated.

My composition consists of a mixture of naphthalene and phenol, preferably crude carbolic acid, dissolved or dispersed in a solvent which is miscible or soluble in the oil of the emulsion. For this solvent, I preferably use a petroleum product such as kerosene or stove oil, although other fractions, and crude oil itself, if not too viscous, may be used.

In preparing the composition, I prefer to use the ingredients in about the following proportions—viz. 1¼ pounds naphthalene, and 2 pounds of crude carbolic acid or phenol, dissolved in 1 gallon of stove oil. Good results may be obtained, however, when the ingredients are varied within the following limits: naphthalene, ¾ to 1½ pounds; crude carbolic acid, 1 to 3 pounds; stove oil, ¾ to 1½ gallons. Naphthalene alone dissolved in stove oil effects some demulsification, but is not satisfactory; carbolic acid alone in the stove oil does not "break" the oil emulsions; a combination of the two effects almost complete demulsification and is commercially satisfactory and economical.

The stove oil may be replaced by any equivalent petroleum solvent which will dissolve the carbolic acid and the naphthalene, and I have used kerosene, Diesel oil, and light crude oil with good results. In order to provide a heavier liquid which is easier to handle with certain types of proportioning pumps, I may add to each gallon of my mixture about one pint of heavy crude oil.

Crude carbolic acid is preferred because it is cheaper, and equally satisfactory to the pure phenol, and it is usually supplied as a liquid (with some contained water) which facilitates the mixing and dissolving of the ingredients. I prefer to use flake naphthalene, although other forms including unrefined naphthalene may also be used.

These ingredients are mixed and agitated until the solids are dissolved. My process of demulsification of crude oil comprises dissolving the naphthalene and carbolic acid in the solvent such as stove oil, and then mixing 10 to 15 gallons of my composition with 1000 barrels of crude oil containing emulsion. By introducing the composition into the inlet pipe to the tank, as the tank is being filled, I get thorough mixing and no further mechanical stirring is required. In one case I have used 15 gallons of my composition to 1000 barrels crude oil of about 14° gravity containing six percent water and emulsion. After introduction of my material, and standing for five days at atmospheric temperature of about 65° F. substantially all of the water including that in the emulsified portion settled out and was easily separated from crude oil. Heating of the crude oil emulsion to temperatures up to about 90° F. (above which volatile portions would be lost) is advantageous in that the speed of demulsification is increased, but heating is not necessary if the mixture is allowed to stand for a few days.

In another case, with slightly different crude oil, I introduced my composition into the pipe line going to the storage tanks in the ratio of one gallon to 100 barrels of oil, and satisfactory demulsification and separation of water from oil was effected in the tank. The amount of my composition which will be required in any particular oil will depend upon the amount of emulsified material present, and upon the inherent stability of the emulsion, and the quantities given are illustrative only.

I claim:

1. The process of demulsification of water-in-oil emulsions comprising treating the emulsion with a solution consisting of naphthalene and phenol in a dispersing liquid in which these materials and the oil of the emulsion are mutually miscible.

2. The process of demulsification of water-in-oil emulsions comprising dispersing a mixture of naphthalene and phenol in a solvent in which these materials and the oil are mutually miscible, mixing the dispersion with the emulsion, and separating the oil and water.

3. A composition of matter for breaking water-in-oil emulsion consisting of a mixture of naphthalene and carbolic acid dissolved in a solvent which is miscible with the oil of the emulsion to be treated.

4. A composition of matter for breaking petroleum oil emulsions consisting of a mixture of naphthalene and carbolic acid dissolved in a petroleum solvent.

5. A composition of matter consisting of about 1 part by weight of naphthalene to 2 parts by weight carbolic acid dissolved in a petroleum solvent.

6. A composition of matter consisting of from ¾ to 1½ pounds of naphthalene, 1 to 3 pounds of carbolic acid, and ¾ to 1½ gallons of a petroleum solvent.

7. A composition of matter consisting of 1¼ pounds of naphthalene, 2 pounds of carbolic acid, and one gallon of stove oil.

GROVER C. PORTER.